United States Patent
Ren et al.

(10) Patent No.: US 11,947,908 B2
(45) Date of Patent: Apr. 2, 2024

(54) WORD EMBEDDING WITH DISENTANGLING PRIOR

(71) Applicant: Baidu USA, LLC, Sunnyvale, CA (US)

(72) Inventors: Shaogang Ren, Redmond, WA (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 145 days.

(21) Appl. No.: 17/224,797

(22) Filed: Apr. 7, 2021

(65) Prior Publication Data
US 2022/0335216 A1 Oct. 20, 2022

(51) Int. Cl.
| | |
|---|---|
| G06F 40/216 | (2020.01) |
| G06F 16/901 | (2019.01) |
| G06F 40/211 | (2020.01) |
| G06F 40/284 | (2020.01) |
| G06F 40/30 | (2020.01) |

(52) U.S. Cl.
CPC ........ *G06F 40/216* (2020.01); *G06F 16/9024* (2019.01); *G06F 40/211* (2020.01); *G06F 40/284* (2020.01); *G06F 40/30* (2020.01)

(58) Field of Classification Search
CPC .. G06F 40/216; G06F 16/9024; G06F 40/211; G06F 40/284; G06F 40/30; G06F 40/279; G06F 40/237; G06N 3/045; G06N 7/01; G06N 3/047; G06N 3/08
See application file for complete search history.

(56) References Cited

U.S. PATENT DOCUMENTS

| | | | |
|---|---|---|---|
| 2012/0150532 A1* | 6/2012 | Mirowski | G06F 40/40 704/E11.001 |
| 2017/0270100 A1* | 9/2017 | Audhkhasi | G06F 40/289 |
| 2019/0034416 A1* | 1/2019 | Al Hasan | G06F 40/56 |
| 2019/0347328 A1* | 11/2019 | Rush | G10L 25/30 |
| 2020/0364505 A1* | 11/2020 | Poole | G06N 3/044 |
| 2020/0380578 A1* | 12/2020 | Xu | G06Q 30/0631 |
| 2021/0319188 A1* | 10/2021 | Zhou | G06F 40/40 |

(Continued)

OTHER PUBLICATIONS

Cho, J., Seo, M., & Hajishirzi, H. (2019). Mixture content selection for diverse sequence generation. arXiv preprint arXiv:1909.01953. (Year: 2019).*

(Continued)

*Primary Examiner* — Bhavesh M Mehta
*Assistant Examiner* — Philip H Lam
(74) *Attorney, Agent, or Firm* — NORTH WEBER & BAUGH LLP

(57) ABSTRACT

Described herein are system and method embodiments to improve word representation learning. Embodiments of a probabilistic prior may seamlessly integrate statistical disentanglement with word embedding. Different from previous deterministic methods, word embedding may be taken as a probabilistic generative model, and it enables imposing a prior that may identify independent factors generating word representation vectors. The probabilistic prior not only enhances the representation of word embedding, but also improves the model's robustness and stability. Furthermore, embodiments of the disclosed method may be flexibly plugged in various word embedding models. Extensive experimental results show that embodiments of the presented method may improve word representation on different tasks.

20 Claims, 5 Drawing Sheets

(56) References Cited

U.S. PATENT DOCUMENTS

2022/0050967 A1* 2/2022 Veyseh .............. G06F 40/242
2022/0171923 A1* 6/2022 Wu .................... G06F 18/29

OTHER PUBLICATIONS

Bi, B., Li, C., Wu, C., Yan, M., Wang, W., Huang, S., . . . & Si, L. (2020). Palm: Pre-training an autoencoding & autoregressive language model for context-conditioned generation. arXiv preprint arXiv:2004.07159. (Year: 2020).*
Zhao, T., Zhao, R., & Eskenazi, M. (2017). Learning discourse-level diversity for neural dialog models using conditional variational autoencoders. arXiv preprint arXiv:1703.10960. (Year: 2017).*
R. K. Kaliyar, "A Multi-layer Bidirectional Transformer Encoder for Pre-trained Word Embedding: A Survey of BERT," 2020 10th International Conference on Cloud Computing, Data Science & Engineering (Confluence), Noida, India, 2020, pp. 336-340, doi: 10.1109/Confluence47617.2020.9058044. (Year: 2020).*
Vikash Balasubramanian (2020). Variational Inference for Text Generation: Improving the Posterior. UWSpace. http://hdl.handle.net/10012/16107 (Year: 2020).*
Bao, Y., Zhou, H., Huang, S., Li, L., Mou, L., Vechtomova, O., . . . & Chen, J. (2019). Generating sentences from disentangled syntactic and semantic spaces. arXiv preprint arXiv:1907.05789. (Year: 2019).*
Ravfogel, S., Elazar, Y., Goldberger, J., & Goldberg, Y. (2020). Unsupervised distillation of syntactic information from contextualized word representations. arXiv preprint arXiv:2010.05265. (Year: 2020).*
Felhi, G., Roux, J. L., & Seddah, D. (2020). Disentangling semantics in language through VAEs and a certain architectural choice. arXiv preprint arXiv:2012.13031. (Year: 2020).*
Lee, D. B., Lee, S., Jeong, W. T., Kim, D., & Hwang, S. J. (2020). Generating diverse and consistent QA pairs from contexts with information-maximizing hierarchical conditional VAEs. arXiv preprint arXiv:2005.13837. (Year: 2020).*
Yang, X., Sun, Y., & Yan, J. (2020). Self-supervised Disentangled Representation Learning. (Year: 2020).*
Bražinskas, A., Havrylov, S., & Titov, I. (2017). Embedding words as distributions with a Bayesian skip-gram model. arXiv preprint arXiv:1711.11027. (Year: 2017).*
The Extended European Search Report dated Aug. 29, 2022, In European Application No. 22 16 6609.2. (8pgs).
Li et al., "A Deep Decomposable Model for Disentangling Syntax and Semantics in Sentence Representation," Findings of the Association for Computational Linguistics: EMNLP 2021, Nov. 2021, pp. 4300-4310, XP055952701, Stroudsburg, PA, USA DOI: 10.18653/v1/2021.findings-emnlp.364 Retrieved from the Internet: <URL:https://aclanthology.org/2021.findingsemnlp.364.pdf> (12pgs).
Liao et al., "Explaining Word Embeddings via Disentangled Representation," Proceedings of the 1st Conference of the Asia-Pacific Chapter of the Association for Computational Linguistics and the 10th International Joint Conference on Natural Language Processing, Dec. 4, 2020, pp. 720-725, XP055952917, Retrieved from the Internet: <URL: https://aclanthology.org/2020.aacl-main. 72 .pdf> [retrieved on Aug. 18, 2022]. (6pgs).
Chen et al., "Investigating Word Meta-Embeddings by Disentangling Common and Individual Information," IEEE Access, IEEE, USA, Vol. 8, Jan. 9, 2020, pp. 11692~11699, XP011767700, DOI: 10.1109/ACCESS.2020.2965719 [Retrieved On Jan. 20, 2020]. (8pgs).
Chen et al., "A Multi-Task Approach for Disentangling Syntax and Semantics in Sentence Representations," arXiv preprint arXiv:1904.01173v1, 2019 (14pgs).
Vashishth et al., "Incorporating Syntactic and Semantic Information in Word Embeddings using Graph Convolutional Networks," arXiv preprint arXiv: 1809.04283v4, 2019. (12pgs).
Levy et al., "Dependency-Based Word Embeddings," Proceedings of the 52nd Annual Meeting of the Association for Computational Linguistics, 2014. (7pgs).
Levy et al., "Neural Word Embedding as Implicit Matrix Factorization," In Advances in Neural Information Processing Systems, 2014. (9pgs).
Luong et al., "Better Word Representations with Recursive Neural Networks for Morphology," In Proc. of the 17th Conf. on Computational Natural Language Learning, 2013. (10 pgs).
Marcheggiani et al., "Encoding Sentences with Graph Convolutional Networks for Semantic Role Labeling," In: Proceedings of the 2017 Conference on Empirical Methods in Natural Language Processing, 2017. (10pgs).
Mikolov et al., "Distributed Representations of Words and Phrases and their Compositionality," arXiv preprint arXiv:1310.4546, 2013. (9pgs).
Mikolov et al., "Linguistic Regularities in Continuous Space Word Representations," In Proceedings of NAACL-HLT, 2013. (6pgs).
Pennington et al., "GloVe:Global Vectors for Word Representation," In Proceedings of the 2014 Conference on Empirical Methods in Natural Language Processing, 2014. (12pgs).
Peters et al., "Deep contextualized word representations," arXiv preprint arXiv:1802.05365, 2018. (15pgs).
Radford et al., "Language Models are Unsupervised Multitask Learners," OpenAI blog 1.8 (2019): 9, 2019. (24pgs).
Yang et al., XLNet: Generalized Autoregressive Pretraining for Language Understanding, arXiv preprint arXiv:1906.08237, 2020. (18pgs).
Baroni et al., "Esslli 2008 workshop on distributional lexical semantics," Association for Logic, Language & Information, 2008. (77pgs).
Baroni et al., "Distributional Memory: A General Framework for Corpus-Based Semantics," Computational Linguistics, vol. 36, No. 4, 673-721, 2010. (50pgs).
Baroni et al., "How We BLESSed Distributional Semantic Evaluation," In Proceedings of the GEMS 2011 Workshop on GEometricalModels of Natural Language Semantics, 2011. (10pgs).
Chen et al., "Learning user and product distributed representations using a sequence model for sentiment analysis," IEEE Computational Intelligence Magazine, 2016. (11pgs).
Devlin et al.,"Bert: Pre-training of deep bidirectional transformers for language understanding," arXiv preprint arXiv:1810.04805, 2019. (16pgs).
Faruqui et al., "Retrofitting word vectors to semantic lexicons," arXiv preprint arXiv:1411.4166, 2015. (10pgs).
Finkelstein et al., "Placing Search in Context:The Concept Revisited," In Proc. of the 10th Int Con. on World Wide Web, 2001. (9pgs).
Gupta et al., "Better word embeddings by disentangling contextual n-gram information," arXiv preprint arXiv:1904.05033, 2019. (7pgs).
Hälvä et al., "Hidden Markov Nonlinear ICA: Unsupervised Learning from Nonstationary Time Series," arXiv preprint arXiv:2006.12107, 2020. (15pgs).
Higgins et al., "beta-VAE:Learning Basic Visual Concepts with a Constrained Variational Framework," In ICLR, 2017. (22 pgs).
Hill et al., "SimLex-999: Evaluating Semantic Models With (Genuine) Similarity Estimation," Computational Linguistics vol. 41, No. 4, 665-695, 2015. (31pgs).
Hochreiter et al., "Long Short-Term Memory," Neural computation, vol. 9 No. 8, 1997. (32pgs).
Hyvarinen et al., "Nonlinear ICA of temporally dependent stationary sources," Proceedings of Machine Learning Research, 2017. (10pgs).
Jurgens et al., "SemEval-2012 Task 2: Measuring Degrees of Relational Similarity," 1st Joint Conference on Lexical & Computational Semantics, 2012. (9pgs).
Khemakhem et al., "VariationalAutoencoders and Nonlinear ICA:AUnifying Framework," arXiv preprint arXiv:1907.04809, 2020. (27pgs).
Kingma et al., "Auto-Encoding Variational Bayes," arXiv preprint arXiv:1312.6114, 2013. (9pgs).
Kipf et al., "Semi-Supervised Classification with Graph Convolutional Networks," arXiv preprint arXiv:1609.02907, 2017. (14pgs).

(56) References Cited

OTHER PUBLICATIONS

Komninos et al., "Dependency Based Embeddings for Sentence Classification Tasks," In Proceedings of NAACL-HLT 2016, pp. 1490-1500, 2016. (11pgs).
Komninos et al., "Dependency Based Embeddings for Sentence Classification Tasks," Proceedings of NAACL-HLT, 2016. (11pgs).
Sohn et al.,"Learning Structured Output Representation Using Deep Conditional Generative Models," In: Proceedings of the 28th International Conference on Neural Information Processing Systems, 2015. (9pgs).
Tang et al., "Learning sentiment-specific word embedding for twitter sentiment classification," In: Proceedings of the 52nd Annual Meeting of the Association for Computational Linguistics, 2014. (11 pgs).
Vashishth et al., "Incorporating Syntactic and Semantic Information in Word Embeddings using Graph Convolutional Networks," In: Proceedings of the 57th Annual Meeting of the Association for Computational Linguistics, 2019. (11pgs).
Vaswani et al., "Attention Is All You Need," arXiv preprint arXiv:1706.03762, 2017. (15pgs).

* cited by examiner

300

Extract, by an NLP parser, a dependency parse graph for a given text sequence comprising a plurality of words ⟶ 305

Define, in the dependency parse graph, neighbors of a word as a context for the word ⟶ 310

FIG. 3

WORD EMBEDDING WITH DISENTANGLING PRIOR

BACKGROUND

A. Technical Field

The present disclosure relates generally to systems and methods for computer learning that can provide improved computer performance, features, and uses. More particularly, the present disclosure relates to systems and methods for word embedding disentanglement.

B. Background

Deep neural networks have achieved great successes in many domains, such as computer vision, natural language processing, recommender systems, etc.

Unsupervised word or item embedding yields the essential representation for down-stream information retrieval systems or natural language processing models. Recent progress on pre-trained models significantly improved language processing tasks. Although learned word representations can show some simple semantic properties, one cannot directly get more information about the word representations, and they are generally taken as a direct input for the downstream black box neural models.

Accordingly, what is needed are systems and methods to learn word embedding for improved performance.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. ("FIG.") 1 depicts a network diagram of a model with disentangling prior, according to one or more embodiments of the present disclosure.

FIG. 3 depicts a process to improve disentangled word embedding, according to embodiments of the present disclosure.

DETAILED DESCRIPTION OF EMBODIMENTS

Figure 1:
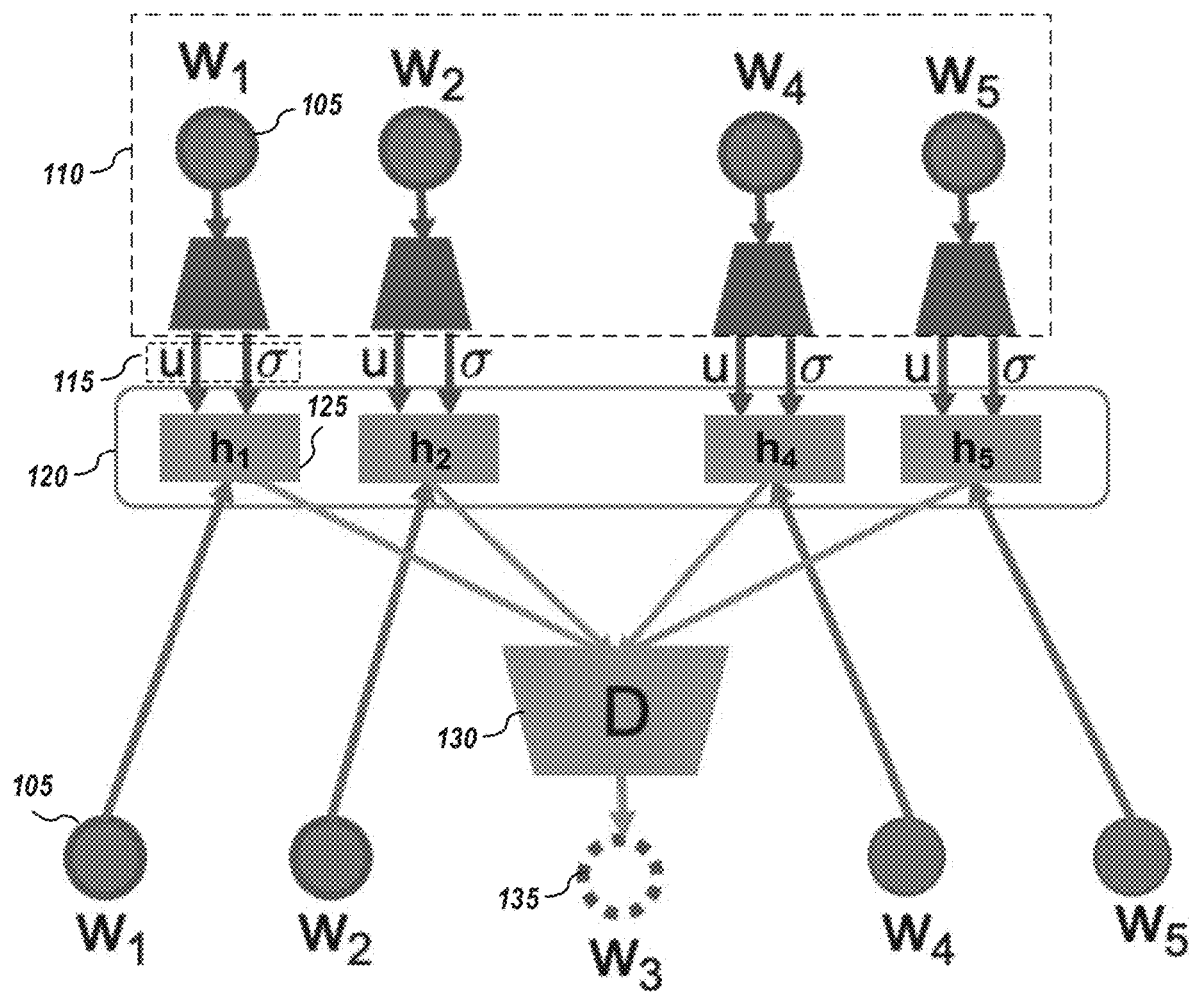

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

Unsupervised word or item embedding yields the essential representation for down-stream information retrieval systems or natural language processing models. Recent progress on pre-trained models significantly improved language processing tasks. To further improve word representation learning, embodiments of a neural probabilistic prior are presented in this patent disclosure to integrate disentangling generative models and word representation learning.

Described briefly hereinafter in this section is a review of word embedding models and disentanglement.

1. Word Embedding

Classical shallow word embedding methods such as Skip-gram and Continuous Bag of Words (CBOW), and Global Vectors for Word Representation (GloVe) learn word embedding based on the occurrence of words in a sliding window. These confessional word embedding methods learn word semantics based on co-occurrences and often ignore the structural order information in the sequences. The learned word representation can show some simple semantic properties, they are generally taken as the input for down-stream black-box neural network models. Thus shallow word embedding models may capture simple semantic information, but they may lose complicate syntactic and semantic information embodied in sentence and corpus structures.

Pre-trained word embedding and language models may overcome the drawbacks of classical word embedding methods. Pre-trained word embedding models may effectively integrate the learned prior knowledge and the information from the specific tasks in hand. These models usually are capable of capturing the syntax information among the large number of sentences from a corpus by leveraging recurrent neural networks and/or attention mechanism. Training of pre-trained models comes with high costs such as large training corpora, long computation hours, and financial costs. These costs may also reduce the models' flexibility in application scenarios when the training corpus or dataset is small.

In order to retain both effectiveness and flexibility of representation learning, researchers try to incorporate syntactic and semantic information to shallow or small models. These structural information may be flexibly encoded in the learned representation with graph convolutional neural networks (GCNs). Some have improved word embedding by leveraging both syntactic and semantic structural information extracted from the train corpus. In one or more embodiments of the present patent disclosure, a CBOW model equipped with GCNs is used.

2. Disentanglement

Variants of variational autoencoders (VAEs) are considered the state-of-the-art for unsupervised disentanglement learning. Some proposed the β-VAE, introducing a hyper-parameter for the Kullback-Leibler (KL) regularizer of vanilla VAEs, to maximize the following objective:

$$\min_{\phi,\theta} \mathbb{E}_{p(x)}[\mathbb{E}_{q_\phi(h|x)}[\log p_\theta(x|h)] - \beta KL(q_\phi(h|x)\|p(h))]. \quad (1)$$

Here h is the latent representation of x. By setting $\beta > 1$, the encoder will be forced to match the factorized unite Gaussian prior. This procedure introduces additional constraints on the capacity of the latent bottleneck, encouraging the encoder to learn a disentangled representation for the data. Variants of β-VAE have been used to obtain disentanglement representation from different data sets including images and texts.

Recently, nonlinear independent component analysis (ICA) theory has been utilized to pursue disentanglement in latent space. This line of works lie in the theory that latent factors of data distribution may be approximately recovered by leveraging weak data labels or data structure information.

In the present patent disclosure, embodiments of a model to improve word representation by leveraging statistical disentanglement techniques are presented. Different from classical deterministic word embedding approaches, word embedding is viewed as a probabilistic generative model, concretely, conditional variational autoencoder (CVAE), in the present patent disclosure. This perspective allows a probabilistic prior that enables the model to learn independent latent factors that generate embedding vectors. The model may learn disentangled word representation by leveraging nonlinear Independent Component Analysis (ICA). Moreover, the method may be easily plugged to any word embedding models for performance improvement. Experimental results on different evaluation tasks validate advantages of presented method embodiments.

B. Embodiments of Methodology

In this section, word embedding from CVAE prospective are presented. Embodiments of a prior based on CVAE and nonlinear ICA are also disclosed.

1. CVAE View of Word Embedding

Most classical word embedding methods may be categorized as variants of CVAE. For a text sequence $s = [w_1, \ldots, w_n]$, $\tilde{s}$ is an altered sequence of s. The term "altered" shall be understood to mean that one or more words in the sequence may be corrupted, masked, missing, changed, added, adjusted, or any combination thereof. In one or more embodiments, the altered sequence $\tilde{s}$ has one or more words masked with corresponding binary masks m. In one or more embodiments of the present disclosure, $y = \{s, m\}$ is taken as the label information regarding $\tilde{s}$, and the conditional distribution $p(\tilde{s}|y)$ is modeled with a conditional variational autoencoder. It outperforms deterministic models when the distribution $p(\tilde{s}|y)$ is multi-modal. In one or more embodiments, an objective for a CVAE model may be expressed as:

$$\mathcal{L}_{CAVE}(\tilde{s}, y; \theta, \phi, \psi) = \mathbb{E}_{q_\phi(h|\tilde{s},y)}[\log p_\theta(\tilde{s}|h, y)] - KL(q_\phi(h|\tilde{s}, y)\|p_\psi(h|y) \leq p_{\phi,\psi}(\tilde{s}|y)) \quad (2)$$

For conventional word embedding methods, h is a sequential concatenation of unmasked words' embedding vectors. The encoder ($q_\phi$) is an indicator function converting unmasked tokens to their embedding vectors. The decoder ($p_\theta$) maps from h to the masked or missing word tokens.

Figure 2:
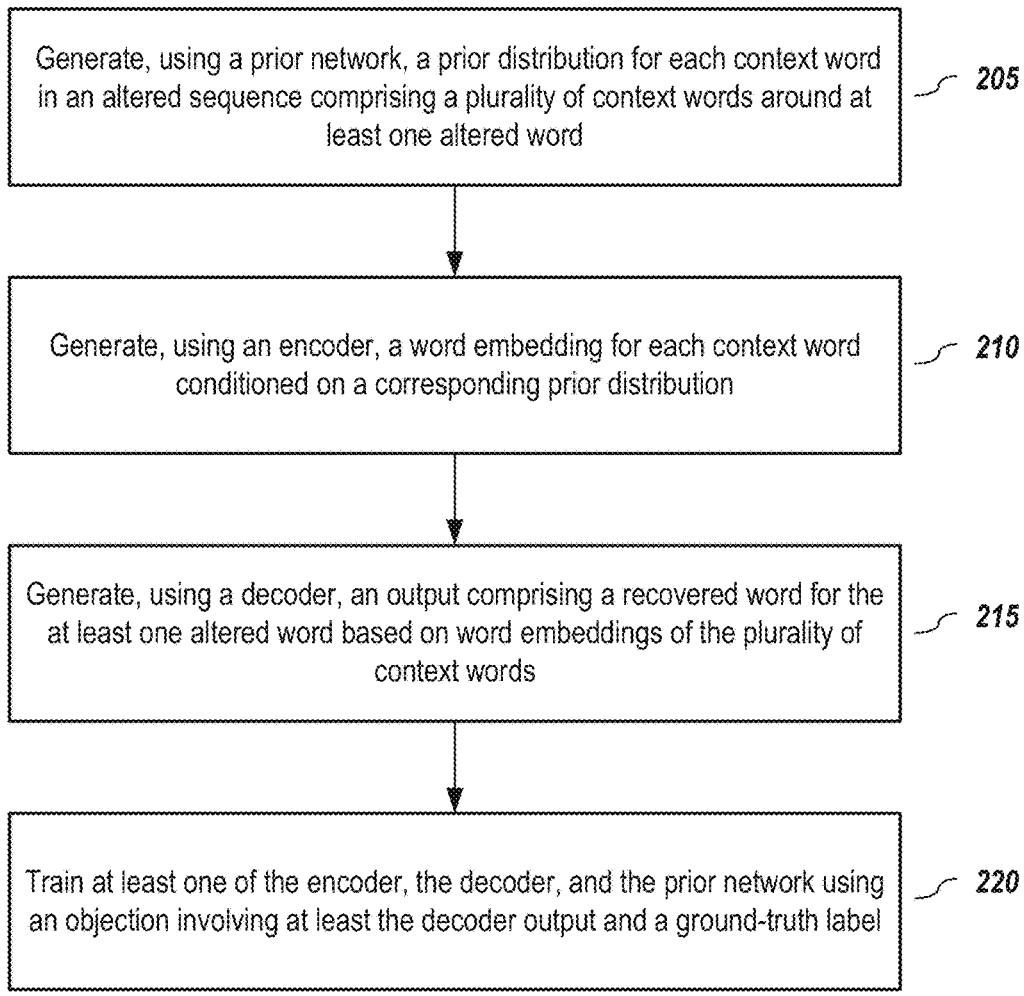
FIG. 2 depicts a process for disentangling word embedding, according to one or more embodiments of the present disclosure.

FIG. 1 depicts a network diagram of a model 100 for disentangled word embedding, according to one or more embodiments of the present disclosure. FIG. 2 depicts a process for disentangling word embedding with model shown in FIG. 1, according to one or more embodiments of the present disclosure. As shown in FIG. 1, the model comprises a prior network 110, an encoder 120, and a decoder 130. In one or more embodiments, the prior network 110 is implemented with one or more fully connected layers with Rectified Linear Unit (ReLU) activation. In one or more embodiments, the prior network 110 is a fully connect network, e.g., a multilayer perceptron (MLP).

Given an altered sequence 105, which has at least one word altered and comprises a plurality of context words (e.g., $w_1$, $w_2$, $w_4$, and $w_5$) around the at least one altered word, a prior network 110 receives the altered sequence 105 to generate (205) a prior distribution 115 for each context word. The phrase "altered" shall be understood to cover embodiments of one or more words in the altered sequence being corrupted, masked, or changed from corresponding words in a text sequence, one or more words missing in the altered sequence, or any combination thereof. In one or more embodiments, the altered sequence 105 is obtained from a text sequence (e.g., $w_1$, $w_2$, $w_3$, $w_4$, and $w_5$) with binary masks (e.g., m) applied on at least one word (e.g., $w_3$). In one or more embodiments, the word covered with the binary mask is absent in the altered sequence 105.

In one or more embodiments, the prior distribution 115 is a Gaussian distribution parameterized by a mean µ and standard derivation σ. The encoder 120 generates (210) a word embedding 125 for each context word conditioned on the corresponding prior distribution 115. The decoder 130 generates (215) a decoder output comprising at least one recovered word 135 respectively corresponding to the at least at least one altered word based on word embeddings of the plurality of context words. In one or more embodiments, the plurality of context words are words within a window having a predetermined size around the each altered word. In one or more embodiments, the context words may be defined using a parse graph as described in more detail in section 2.2, below. At least one of the prior networks, the encoder and the decoder may be trained (220) using an objective involving at least the decoder output and a ground-truth label constructed from the text sequence and the binary masks.

In classical embedding methods, both encoder and decoder are deterministic functions. h's prior $p_\psi$ is a deterministic indicator function in conventional methods, and the KL term is vanished as well. In one or more embodiments of the present disclosure, the indicator of the prior ($p_\psi$) of h is replaced with a real distribution function and regularization is imposed on embedding vectors. The prior may enable the model to achieve disentanglement effect across the embedding entries. The decoder may be implemented with a neural network or GCNs. By leveraging syntactic and semantic structure information, GCNs may learn task agnostic word representations. GCNs may be flexible to aggregate structural knowledge among the words, and may improve the representation of learned word representations.

2. Embodiments of Disentangling Prior

In this subsection, embodiments of a word embedding distribution prior (WEP) to the aforementioned CVAE model are presented, and the prior may be parameterized with a neural network.

2.1 Nonlinear ICA for Disentanglement

One or more embodiments of the present disclosure aim to achieve disentanglement of word embedding by leveraging the sequential label information y={s, m}. On observation of the conditional VAE framework of word embedding, nonlinear ICA is used to improve word embedding in embodiments of the present disclosure. For a word $w_t$, the distribution regarding $h_t$ may be a factorial member of the exponential family with v sufficient statistics, conditioned on word token $w_t$. In one or more embodiments, the general form of $h_t$ prior distribution $p_\psi$ may be written as:

$$p_\psi(h_t | w_t) = \prod_{i=1}^{d} \frac{Q_i(h_{t,i})}{Z_i(w_t)} \exp\left[\sum_{j=1}^{v} T_{i,j}(h_{t,i})\lambda_{i,j}(w_c)\right]. \quad (3)$$

Here $Q_i$ is the base measure, $Z_i$ is a normalizing constant, $T_{i,j}$ are component of the sufficient statistic, and $\lambda_{i,j}$ are corresponding parameters, depending on $w_k$. In one or more embodiments, s̃ is the output of an arbitrarily complex, inevitable, and deterministic decoder from the latent space to the data space, i.e., s̃=D(h). In other words, the decoder D maps from latent space h to the masked or missing word tokens. In one or more embodiments, using nonlinear ICA, with enough training samples, the conditional VAE may uncover one or more factors generating the word embedding vector $h_t$, i.e., $$T(h_t) = A\hat{T}(\hat{h}_t) + c, Q = A\hat{Q} \quad (4)$$

Here $\hat{T}$, $\hat{h}_t$, and $\hat{Q}$ are learned from the model, and they correspond to ground truth T, $h_t$, and Q, respectively. A is a full rank matrix and c is a constant vector. Hence the base measure Q and sufficient statistics T regarding the word embedding vector $h_t$ may be linearly recovered by the model as long as there are enough word token labels regarding the conditional prior distribution $p_\psi(h_t|w_t)$.

In the present disclosure, one or more embodiments impose the prior distribution on word embedding via the nonlinear ICA generative framework. Gaussian distribution may be employed as the prior $p_\psi(h_t|w_t)$, and the mean µ and variance $\sigma^2$ may be parameterized by a neural network with word token ($w_t$) as the input. Neural network $p_\psi$ may accumulate knowledge across all the words and may linearly identify one or more independent latent factors generating the vocabulary.

2.2 Example Implementation Embodiments

In one or more embodiments of the present disclosure, a CVAE is used to model work embedding, and the context words (tokens) are taken as the label regarding a sequence of masked sentence. The concatenation of context words' embedding vectors (h) may be the latent variable of the conditional VAE model. FIG. 1 shows a diagram of a CVAE model according to embodiments of the present disclosure. An exponential family prior may be added to each word's embedding vector, and the prior may be dependent on the word's label information. In one or more embodiments, a Gaussian distribution is used as the prior distribution for embedding vectors. Described below are embodiments of a sequence context model (sliding window) and graph context cases extended from the sequence context model.

In one or more embodiments, the context of a word $w_k$ may be defined as $c_{w_k} = \{w_{k+j} : -c \leq j \leq c, j \neq 0\}$ for a window size of c, a positive integer number. In one or more embodiments, for a word $w_t \in c_{w_k}$, prior distribution parameters regarding embedding vector $h_i$ may be defined as $\mu(w_t)$ and $\sigma(w_t)$, where $\mu(w_t)$ and $\sigma(w_t)$ are the mean and standard derivation, respectively, and they are parameterized with a neural network with word token $w_t$ as the input.

In one or more embodiments, the prior distribution may be integrated with word embedding under the conditional VAE framework discussed earlier. In one or more embodiments, the objective regarding the draw of $w_k$ and $c_{w_k}$ may be written as:

$$\mathcal{L}(w_k, c_{w_k}; \theta, \psi, h) = \mathbb{E}_{q(h|c_{w_k})}[\log p_\theta(w_k | h)] - KL(q(h | c_{w_k}) \| p_\psi(h | c_{w_k})) \quad (5)$$

In equation (5), the objective comprises a reconstruction term and a regularization term. $q(h|c_{w_k})$ is a deterministic indicator function. The regularization term is a KL divergence, which may be replaced with a Gaussian likelihood value. Thus, The objective may then be expressed as:

$$\mathcal{L}(w_k, c_{w_k}; \theta, \psi, h) = \quad (6)$$

$$\mathbb{E}_{q(h|c_{w_k})}[\log p_\theta(w_k | h)] - \alpha \sum_{w_i \in c_{w_k}} \left\{ \frac{1}{2} \left( \frac{h_i - \mu(w_i)}{\sigma(w_i)} \right)^2 + \log \sigma(w_i) \right\}$$

Here $\alpha$ is a non-negative value controlling the impact or weight of the prior. The reconstruction term $$\left( \mathbb{E}_{q(h|c_{w_k})}[\log p_\theta(w_k | h)] \right)$$

may be implemented with any word embedding model's loss function. The distribution parameter neural networks $\mu$ and $\sigma$ statistically aggregation information across all the words' structure distributions, and uncover later factors that generate word representations. One embodiment of the neural network structure for the prior $p_\psi$ is presented in Table 1. In one or more embodiments, word token ID may be duplicated multiple times, e.g., 32 times shown in Table 1, and then be used to form an input vector for the prior network. Output of the prior network may be evenly divided into two parts, $\mu$ and $\log \sigma$. In one or more embodiments, the objective (6) may have two sets of parameters, $\theta$ and $\psi$, corresponding to the parameter of the decoder and the prior. In one or more embodiments, SynGCN and SemGCN are used for the reconstruction term in (6). In both models, a GCN is employed for the decoder in order to incorporate the syntactic and semantic structural knowledge.

TABLE 1

One network structure embodiment for the prior
The prior function $p_\psi$

| Layer | Dimension of Output | Batch Normalization | Activation function |
|---|---|---|---|
| Input $w_t$ | 32 | — | — |
| Fully-Connected | 64 | N | ReLU |
| Fully-Connected | 2 × dim (h) | N | — |

Variants of GCNs used in different applications. In one or more embodiments, two GCNs, SynGCN and SemGCN (Vashishth et al., *Incorporating Syntactic and Semantic Information in Word Embeddings using Graph Convolutional Networks*, In Proceedings of the 57th Conference of the Association for Computational Linguistics, pages 3308-3318, Florence, Italy, incorporated by reference herein in its entirety), are used as base models. SynGCN may utilize syntactic context for word representation learning, while SemGCN may incorporate semantic knowledge. In one or more embodiments of the present disclosure, word embedding may be improved through incorporating graphical syntactic and semantic information, and the context words' sliding window may be replaced by or combined with neighbors in the context syntactic or semantic graph.

FIG. 3 depicts a process to improve disentangled word embedding with GCNs, according to embodiments of the present disclosure. In one or more embodiments of the present disclosure, target and context embeddings are separately defined for each word in the vocabulary as parameters in a disentangled word embedding (DWE) model. For a given text sequence $s = [w_1, \ldots, w_n]$, a dependency parse graph $\mathcal{G}_s = (V_s, \varepsilon_s)$ is firstly extracted (305) using an NLP parser. The parse graph comprises a set of vertices $V_s = w_1, w_2, \ldots, w_n$ and a set of labeled directed dependency edges $\varepsilon_s$ with each edge in a form of $(w_i, w_j, l_{ij})$, where $l_{ij}$ is the dependency relation of a source vertex $(w_i)$ to a destination vertex $(w_j)$. In one or more embodiments, a context for a word $(w_k)$ is defined (310) as its neighbors in $\mathcal{G}_s$, i.e., $c_{w_k} = \mathcal{N}(w_k)$.

In one or more embodiments, besides syntactic information, word embedding may be further improved by incorporating semantic knowledge. The decoder learns a corpus-level labeled graph with words as nodes and edges representing semantic relationship among them from different sources. In one or more embodiments, semantic relations such as hyponymy, hypernymy and synonymy may be represented together in a single graph. In one or more embodiments of the present patent disclosure, WEPSyn and WEPSem are used to represent the disclosed WEP models incorporating with syntactic and semantic information, respectively. In one or more embodiments, both WEPSyn and WEPSem may use the same objective (6) and the same prior network shown in Table 1.

C. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

Embodiments of the present method were compared to existing methods on various datasets. One prior network ($\mu$ and $\sigma$) embodiment for both WEPSyn and WEPSem is given in Table 1. In one or more embodiments, the value of $\alpha$ in (6) may be changed to tune the regularization of the prior distribution. In experiments, $\alpha \in \{0.5, 0.1, 1.0e-4, 1.0e-6\}$ was used.

1. Baselines

In one or more experimental settings, the following baseline methods are considered.

Word2vec: a continuous-bag-of-words.

GloVe: a log-bilinear regression model which leverages global co-occurrence statistics of corpus.

Dependency-based syntactic contexts (Deps): a modification of skip-gram model which uses dependency context in place of sequential context.

Extended Dependency Skipgram (EXT): an extension of Deps which utilizes second-order dependency context features.

SynGCN: a Graph Convolution based method which leverages graph convolutional neural nets and syntactic word relationships to improve word embedding.

SemGCN: a Graph Convolution based method which leverages graph convolutional neural nets and semantic word relationships to improve word embedding.

In one or more evaluations, WEPSyn may be constructed as a SynGCN model incorporated with a prior network embodiment. Similarly, WEPSem may be may be constructed as a SemGCN model enhanced with a prior network.

2. Evaluation Methods

In one or more evaluations, embodiments of the present method were compared against the baselines on the following intrinsic tasks:

Word Similarity is the task of evaluating closeness between semantically similar words. Comparison of different methods was performed on various datasets.

Word Analogy task is to predict word $b_2$, given three words $a_1$, $a_2$, and $b_1$, such that the relation $b_1$: $b_2$ is same as the relation $a_1$: $a_2$. Embodiments of the presented method were compared to the baselines on various datasets for evaluation on this task.

Concept Categorization involves grouping nominal concepts into natural categories. In one or more experiments, evaluations were implemented on various datasets.

3. Results

In this subsection, comparison results between WEPSyn and the baselines are presented first, followed by comparison results between WEPSem and SemGCN.

3.1 WEPSyn

In a set of experiments, WEPSyn and SynGCN use the same syntactic knowledge extracted from a corpus. In the set of experiments, target and context embeddings are separately defined for each word in the vocabulary. After preprocessing, a corpus consisting of multiple sentences with multiple tokens and multiple syntactic dependencies is used. Average sentence length in the corpus is about 20 words. Table 2 gives the performance of different methods.

From Table 2, it may be seen that the embodiment of disentangled word embedding (WEPSyn) performs better than existing methods on 8 out 10 tasks. WEPSyn achieves largest improvement on 4 concept categorization tasks compared with all the baseline methods. It means the presented prior significantly augments the model's ability to capture concept structure. WEPSyn performs better than the baselines on three word similarity tasks. Particularly, WEPSyn has higher scores on all four word similarity tasks in comparison with SynGCN, which also utilizes word syntactic information. WEPSyn obtains around 4.1% and 6.0% absolute performance increase on word similarity and concept categorization. For word analogy task, WEPSyn may achieve comparable results with other methods. As mentioned above, WEPSyn may be taken as the SynGCN model plugged with a prior, and hence the experimental results in Table 2 indicate that the prior may help the model to identify latent independent factors of word embedding. As a result, the WEPSyn model may achieve better results on most settings in comparison with SynGCN.

TABLE 2

WEPSyn evaluation with performance on word similarity (Spearman correlation), concept categorization (cluster purity), and word analogy (Spearman correlation). WEPSyn outperforms existing methods on 8 out 10 settings.

| | Word Similarity | | | | Concept Categorization | | | | Word Analogy | |
|---|---|---|---|---|---|---|---|---|---|---|
| Method | Dataset 1 | Dataset 2 | Dataset 3 | Dataset 4 | Dataset 5 | Dataset 6 | Dataset 7 | Dataset 8 | Dataset 9 | Dataset 10 |
| Word2vec | 71.4 | 52.6 | 38.0 | 30.0 | 63.2 | 43.3 | 77.8 | 63.0 | 18.9 | 44.0 |
| Glove | 69.2 | 53.4 | 36.7 | 29.6 | 58.0 | 41.3 | 80.0 | 59.3 | 18.7 | 45.8 |
| Deps | 65.7 | 36.2 | 39.6 | 33.0 | 61.8 | 41.7 | 65.9 | 55.6 | 22.9 | 40.3 |
| Ext | 69.6 | 44.9 | 43.2 | 18.6 | 52.6 | 35.0 | 65.2 | 66.7 | 21.8 | 18.8 |
| SynGCN | 73.2 | 45.7 | 45.5 | 33.7 | 69.3 | 45.2 | 85.2 | 70.4 | 23.4 | 52.8 |
| DWE | 75.7 | 47.7 | 46.9 | 36.0 | 73.8 | 46.9 | 86.0 | 79.7 | 23.8 | 46.4 |

3.2 WEPSem

In a set of experiments, WEPSem and SemGCN use the same semantic information. The hypernym, hyponym, antonym relations, and synonym relations are used by both WEPSem and SemGCN. Both models are trained using initial embedding either from WEPSyn or SynGCN. In table 3, SG and WS are used to represent SynGCN and WEPSyn, respectively. WEPSem(SG) means the WEPSem model training using initial embedding from SynGCN. Table 3 gives results from SemGCN(SG), WEPSem(SG), and WEPSem(WS) on three tasks, respectively representing the three different evaluation metrics in section C.2. Table 3 shows that WEPSem(SG) achieves similar performance compared with SemGCN(SG). However, WEPSem(WS) achieves improved performance on all three tasks compared against SemGCN(SG). WEPSem obtains around 2.8% overall absolute increase in performance. WEPSem is equal to a SemGCN model enhanced with the proposed prior. It shows that by leveraging syntactic and semantic information, embodiments of the prior may enable the model to capture independent latent factors to identify word similarity, concept categorization, and word analogy.

TABLE 3

WEPSem evaluation with Pre-trained embedding

| Method | Task 1 | Task 2 | Task 3 |
|---|---|---|---|
| SemGCN (SG) | 78.2 | 69.3 | 54.4 |
| WEPSem (SG) | 78.2 | 69.7 | 53.7 |
| WEPSem (WS) | 78.3 | 73.8 | 55.1 |

Figure 4:
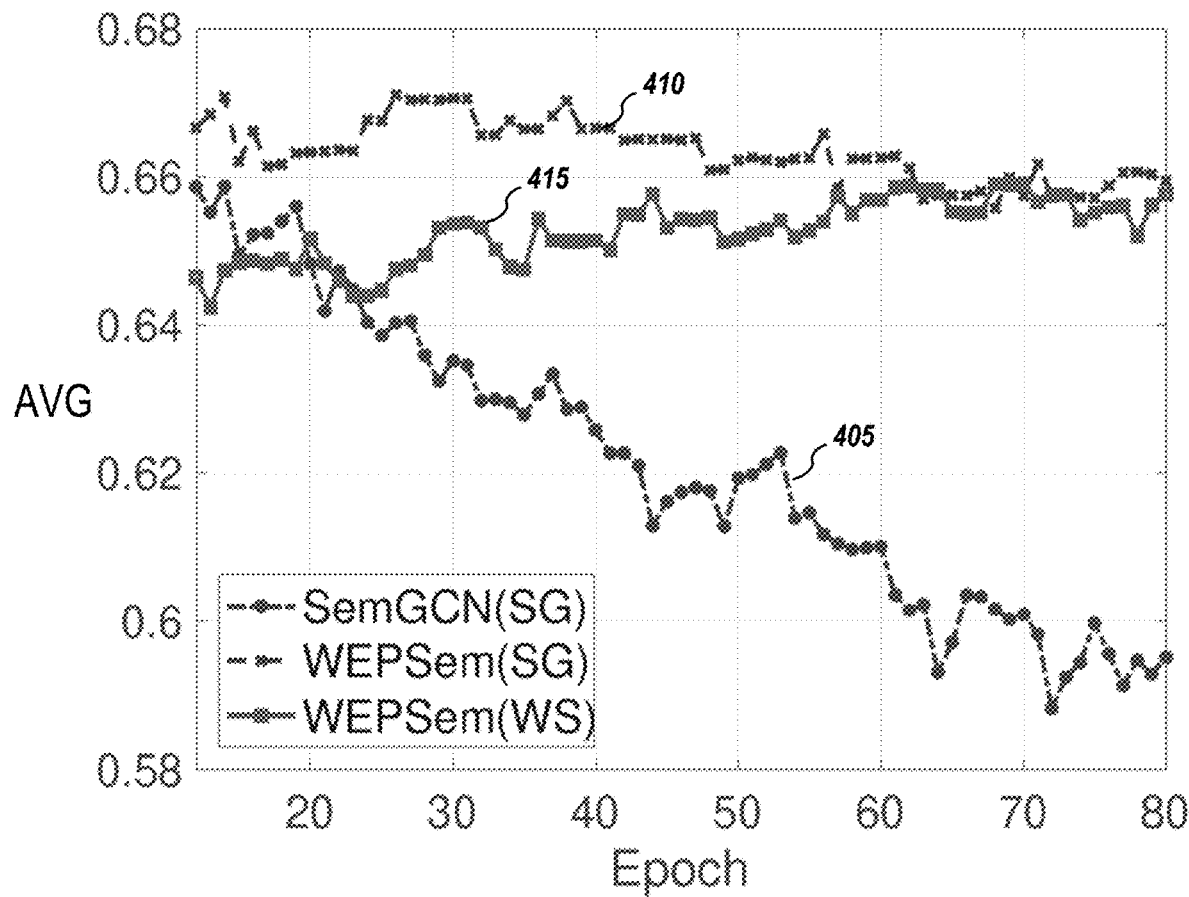
FIG. 4 depicts average scores at different epochs for three models, according to embodiments of the present disclosure.

Embodiments of the presented WEP prior may not only augment the disentanglement of learned word embedding, but also improve the model's stability. FIG. 4 shows the average score of word similarity, concept categorization, and word analogy, respectively, at different epoch numbers for SemGCN(SG) 405, WEPSem(SG) 410 and WEPSem(WS) 415. The performance of WEPSem(WS) continues to increase with the value of training epochs. While without a prior for the embedding vectors, SemGCN(SG)'s performance decreases and it is potentially due to model overfitting. FIG. 4 indicates that embodiments of the presented WEP prior may regularize the dynamic of embedding vectors and improve model's training stability.

D. Some Observations

In the present disclosure, one or more system and method embodiments to improve word representation learning are presented. The presented model embodiments may integrate probabilistic generative models and nonlinear ICA, and equip them with word embedding models. By leveraging nonlinear ICA, embodiments may enhance word disentangling representation. Experiments on various testing setups validate the advantages of the presented method. Besides GCN models, a plug-and-play prior may be integrated with any word or item embedding methods in order to obtain better performance.

E. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen and/or video display. The computing system may also include one or more buses operable to transmit communications between the various hardware components.

Figure 5:
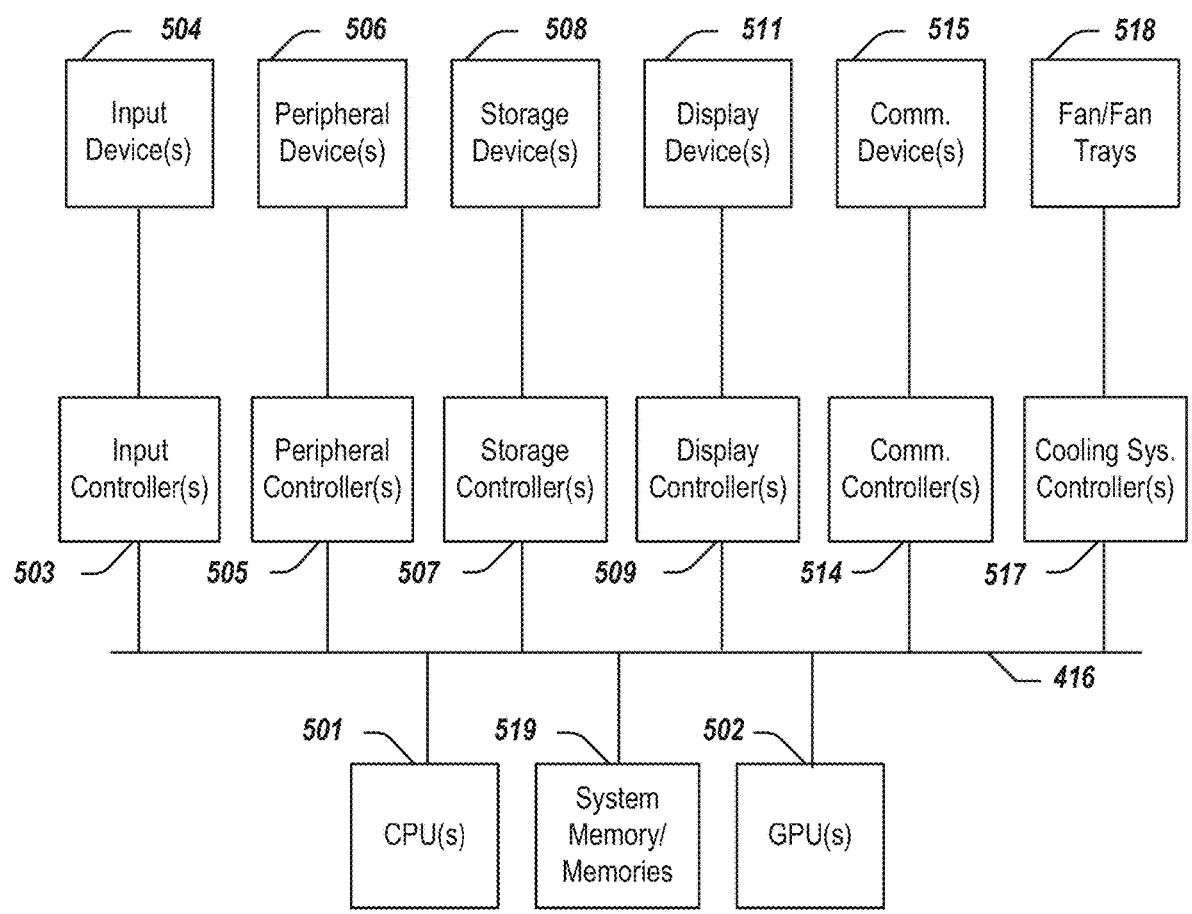
FIG. 5 depicts a simplified block diagram of a computing device/information handling system, according to embodiments of the present disclosure.

FIG. 5 depicts a simplified block diagram of an information handling system (or computing system), according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more central processing units (CPU) 501 that provides computing resources and controls the computer. CPU 501 may be implemented with a microprocessor or the like, and may also include one or more graphics processing units (GPU) 502 and/or a floating-point coprocessor for mathematical computations. In one or more embodiments, one or more GPUs 502 may be incorporated within the display controller 509, such as part of a graphics card or cards. The system 500 may also include a system memory 519, which may comprise RAM, ROM, or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or any other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 500 comprises one or more fans or fan trays 518 and a cooling subsystem controller or controllers 517 that monitors thermal temperature(s) of the system 500 (or components thereof) and operates the fans/fan trays 518 to help regulate the temperature.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for word embedding disentanglement comprising:
    given an altered sequence comprising a plurality of context words related to at least one altered word, generating, using a prior neural network, a prior distribution for each context word;
    generating, using an encoder, a word embedding for each context word conditioned on the prior distribution corresponding to the context word which was generated using the prior neural network, in which a distribution related to the word embedding is treated as a factorial member of an exponential family and information related to an exponential family prior is incorporated with the word embedding;
    generating, using a decoder, a decoder output comprising one or more recovered words for the at least one altered word based on word embeddings of the plurality of context words; and
    training at least one of the prior neural network, the encoder, and the decoder using an objective involving at least the decoder output and a ground-truth label comprising a text sequence and binary masks, wherein the altered sequence is constructed from the text sequence with a binary mask or masks on one or more words in the text sequence.

2. The computer-implemented method of claim 1, wherein the prior distribution for each context word has parameters comprising a mean and a standard derivation.

3. The computer-implemented method of claim 1, wherein the plurality of context words are within a window having a predetermined size around the at least one altered word.

4. The computer-implemented method of claim 1, wherein the altered sequence is constructed from a text sequence with the binary masks on one or more words in the text sequence, and the plurality of context words are selected using steps of:
    extracting a dependency parse graph for the text sequence; and
    defining, in the dependency parse graph, neighbors of a word as the context words of the word.

5. The computer-implemented method of claim 4, wherein the decoder is a graph convolutional network (GCN).

6. The computer-implemented method of claim 1, wherein the objective comprises a reconstruction term and a regularization term represented as a Kullback-Leibler (KL) divergence between an encoder distribution and the prior distribution.

7. The computer-implemented method of claim 1, wherein the objective comprises a reconstruction term and a regularization term represented as a Gaussian likelihood value, the Gaussian likelihood value is a function of the mean and the standard derivation of the prior distribution.

8. A non-transitory computer-readable medium or media comprising one or more sequences of instructions which, when executed by at least one processor, causes steps for word embedding disentanglement comprising:

given an altered sequence comprising a plurality of context words related to at least one altered word, generating, using a prior neural network, a prior distribution for each context word;

generating, using an encoder, a word embedding for each context word conditioned on the prior distribution corresponding to the context word which was generated using the prior neural network, in which a distribution related to the word embedding is treated as a factorial member of an exponential family and information related to an exponential family prior is incorporated with the word embedding;

generating, using a decoder, a decoder output comprising one or more recovered words for the at least one altered word based on word embeddings of the plurality of context words; and training at least one of the prior neural network, the encoder, and the decoder using an objective involving at least the decoder output and a ground-truth label comprising a text sequence and binary masks, wherein the altered sequence is constructed from the text sequence with a binary mask or masks on one or more words in the text sequence.

9. The computer-implemented method of claim 1, further comprising:

including the prior neural network in an embedding model.

10. The computer-implemented method of claim 4, wherein the step of extracting a dependency parse graph for the text sequence comprises:

using a natural language processing (NLP) parser in extracting the dependency parse graph for the text sequence.

11. The non-transitory computer-readable medium or media of claim 8, wherein the prior distribution for each context word has parameters including a mean and a standard derivation.

12. The non-transitory computer-readable medium or media of claim 8, wherein the altered sequence is constructed from a text sequence with the binary masks on one or more words in the text sequence, and the plurality of context words are selected using steps of:

extracting, using a natural language processing (NLP) parser, a dependency parse graph for the text sequence; and defining, in the dependency parse graph, neighbors of a word as the context words of the word.

13. The non-transitory computer-readable medium or media of claim 8, wherein the objective comprises a reconstruction term and a regularization term represented as a Kullback-Leibler (KL) divergence between an encoder distribution and the prior distribution.

14. The non-transitory computer-readable medium or media of claim 8, wherein the objective comprises a reconstruction term and a regularization term represented as a Gaussian likelihood value, the Gaussian likelihood value is a function of the mean and the standard derivation of the prior distribution.

15. A system for word embedding disentanglement comprising:

one or more processors; and a non-transitory computer-readable medium or media comprising one or more sets of instructions which, when executed by at least one of the one or more processors, causes steps to be performed comprising:

given an altered sequence comprising a plurality of context words related to at least one altered word, generating, using a prior neural network, a prior distribution for each context word;

generating, using an encoder, a word embedding for each context word conditioned on the prior distribution corresponding to the context word which was generated using the prior neural network, in which a distribution related to the word embedding is treated as a factorial member of an exponential family and information related to an exponential family prior is incorporated with the word embedding; and generating, using a decoder, a decoder output comprising a one or more recovered words for the at least one altered word based on word embeddings of the plurality of context words; and training at least one of the prior neural network, the encoder, and the decoder using an objective involving at least the decoder output and a ground-truth label comprising a text sequence and binary masks, wherein the altered sequence is constructed from the text sequence with a binary mask or masks on one or more words in the text sequence.

16. The system of claim 15, wherein the prior distribution for each context word has parameters including a mean and a standard derivation.

17. The system of claim 15, wherein the decoder is a graph convolutional network (GCN).

18. The system of claim 15, wherein the objective comprises a reconstruction term and a regularization term represented as a Kullback-Leibler (KL) divergence between an encoder distribution and the prior distribution.

19. The system of claim 15, wherein the objective comprises a reconstruction term and a regularization term represented as a Gaussian likelihood value, the Gaussian likelihood value is a function of the mean and the standard derivation of the prior distribution.

20. The system of claim 15, wherein the altered sequence is constructed from a text sequence with the binary masks on one or more words in the text sequence, the plurality of context words are selected using steps of:

extracting, by a natural language processing (NLP) parser, a dependency parse graph for the text sequence; and defining, in the dependency parse graph, neighbors of a word as the context word of the word.

\* \* \* \* \*